United States Patent [19]

de la Roche Kerandraon et al.

[11] 4,406,586

[45] Sep. 27, 1983

[54] DEVICE TO CONVERT THE ENERGY OF A FLUID IN MOTION

[76] Inventors: Olivier de la Roche Kerandraon, 18 rue de Gravelle, 75012 Paris; Pierre Guillaume, 30 rue Boissière, 75116 Paris; Daniel Paroldi, 24 rue Pierre Larousse, 75014 Paris, all of France

[21] Appl. No.: 224,513

[22] PCT Filed: Mar. 28, 1980

[86] PCT No.: PCT/FR80/00048

§ 371 Date: Nov. 13, 1980

§ 102(e) Date: Nov. 13, 1980

[87] PCT Pub. No.: WO80/02181

PCT Pub. Date: Oct. 16, 1980

[51] Int. Cl.³ .............................................. F03B 13/12
[52] U.S. Cl. .......................................... 416/85; 415/7; 416/117; 416/139
[58] Field of Search .......................... 415/7; 416/84–86, 416/139 A, 117

[56] References Cited

U.S. PATENT DOCUMENTS

| 583,171 | 5/1897 | Curry | 416/139 A X |
| 611,098 | 9/1898 | Blazer | 416/140 R X |
| 1,823,169 | 9/1931 | Schneider . | |
| 3,988,592 | 10/1976 | Porter | 415/7 X |
| 4,045,148 | 8/1977 | Morin | 416/117 X |
| 4,221,538 | 9/1980 | Wells | 415/7 X |
| 4,313,711 | 2/1982 | Lee | 415/7 |

FOREIGN PATENT DOCUMENTS

| 403073 | 7/1934 | Belgium . | |
| 2734829 | 2/1978 | Fed. Rep. of Germany | 416/117 |
| 909873 | 5/1946 | France | 416/117 |
| 2359744 | 2/1978 | France . | |
| 44-28402 | 12/1969 | Japan | 416/117 |
| 49075 | 9/1918 | Sweden | 416/139 A |
| 745084 | 2/1956 | United Kingdom | 416/117 |
| 1447758 | 9/1976 | United Kingdom | 415/2 A |
| 1449740 | 9/1976 | United Kingdom . | |

Primary Examiner—Everette A. Powell, Jr.
Attorney, Agent, or Firm—Young & Thompson

[57] ABSTRACT

A device to convert wave energy into mechanical energy, comprises a buoyant structure whose upper portion is in the region of wave action but whose lower section is below the region of wave action, so that the water adjacent the upper and lower sections of the structure has vertical movement relative to itself. This relative movement is used to rotate a vertical shaft having radially extending horizontal axles on which panels are pivotally mounted. Ballast and/or floats are used to impose on the panels a bias tending to maintain them horizontal. The relative movement of the water is used to impel fluid vertically relative to the panels in alternatingly opposite directions; and the bias imposed by the ballast and/or floats thus causes a planing wing action of the panels which impels the shaft in rotation in one direction regardless of the direction of the movement of the impelling fluid. The floating structure can rise and fall with the waves (FIGS. 1-6 and 8), in which case the blade are disposed at the lower end of the device, in the still water; or the device can be stationary in the water (FIG. 7), in which case the blades are subject to a fluid such as the water itself or air impelled by the water, at the upper end of the device.

11 Claims, 9 Drawing Figures

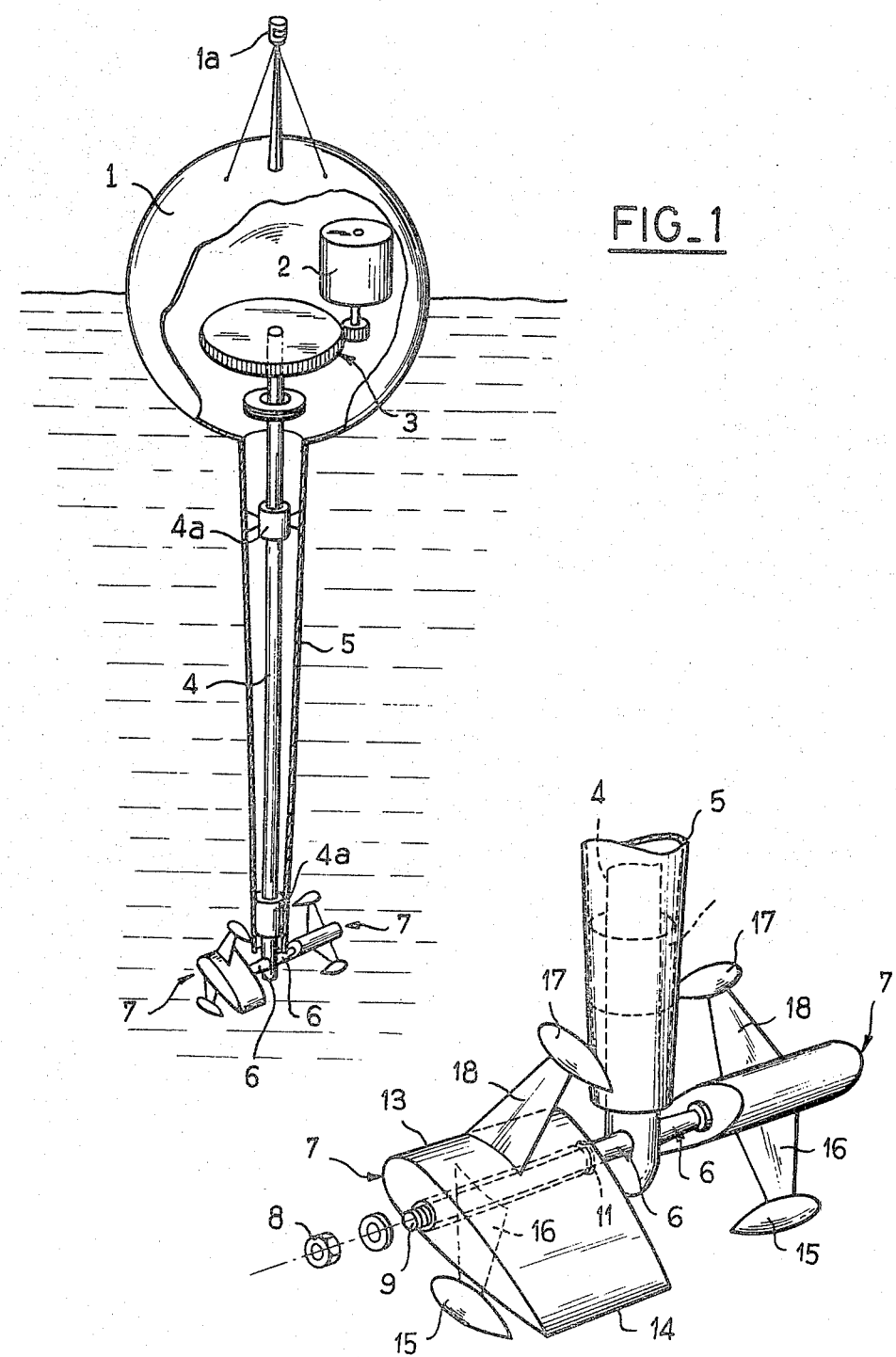
FIG_1
FIG_2

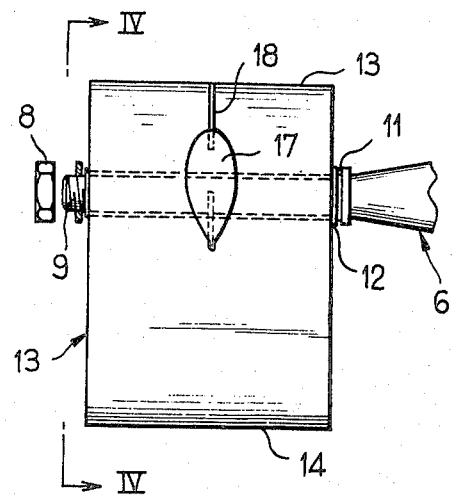
FIG_3
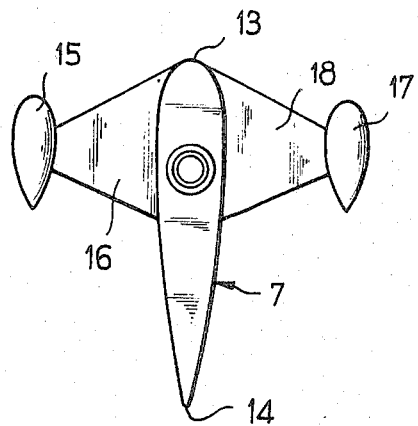
FIG_4
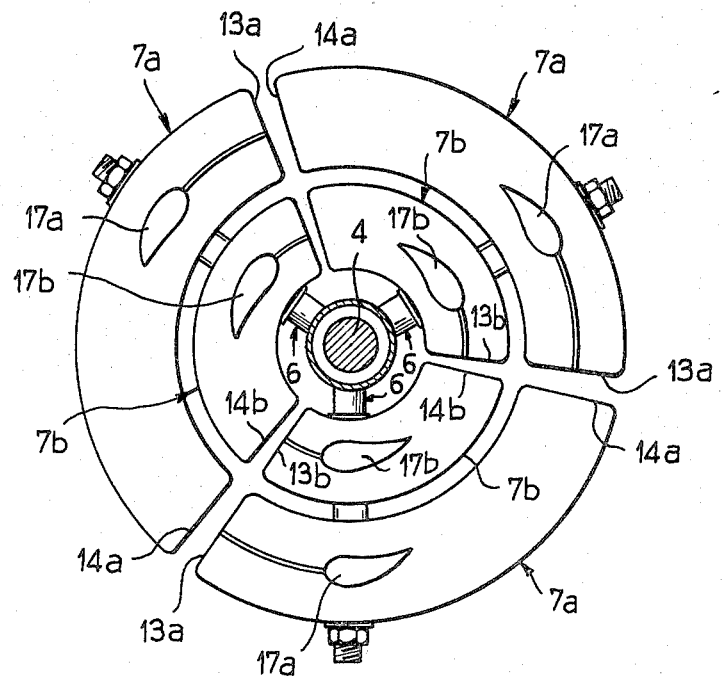
FIG_5

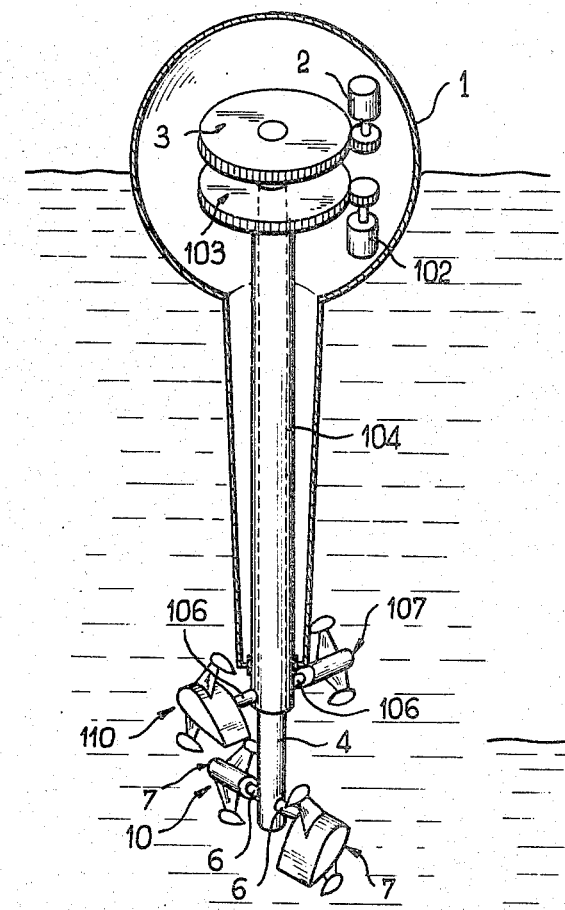
FIG_6
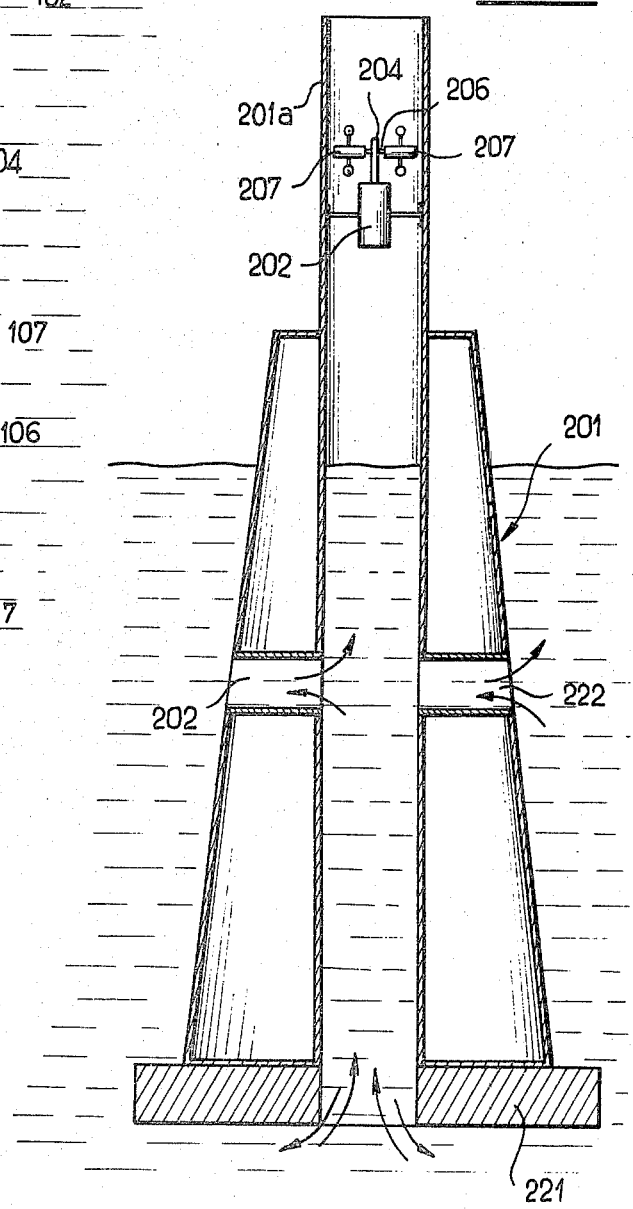
FIG_7

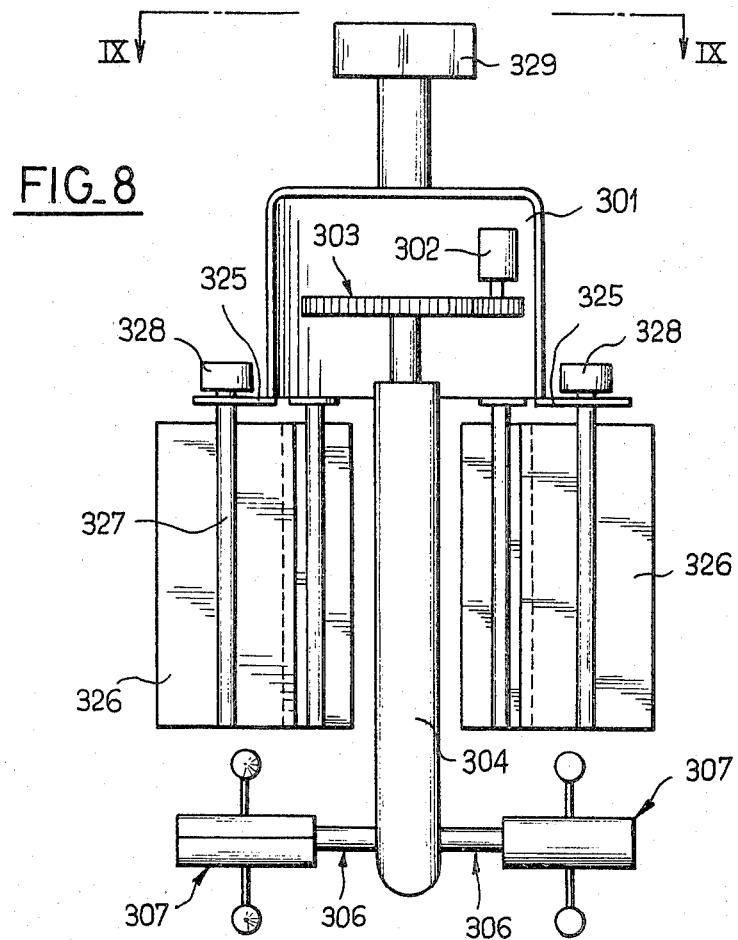
FIG_8
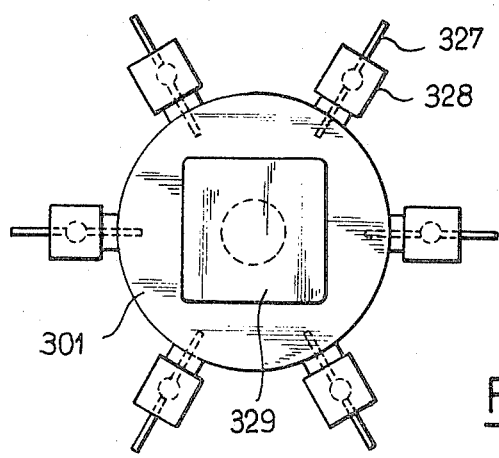
FIG_9

DEVICE TO CONVERT THE ENERGY OF A FLUID IN MOTION

The present invention relates to a device for converting the energy of a fluid in motion.

In known devices of this type, with the aim for example of collecting energy from waves by turbines, the essential problem to be solved is that of the periodic change of direction of the water.

The solution generally adopted consists of arranging panels, movable in rotation around axes perpendicular to a transmission shaft, so as to form a sort of variable pitch propeller which can be reversed. It is known to achieve this pitch reversal automatically by spacing the center of thrust on the panel from the axis of rotation of this panel. At each reversal of the direction thrust of the water, the panel begins by tilting in the right direction.

The limitation of the amplitude of swing of the panel can be obtained by fixed stops. However a propeller with constant pitch (in one or other direction), is then obtained, which does not achieve the optimum yield when the water flow varies. Springs with a tendency to resist the swing may also be provided. The tilt of the panels is then dependent on the water flow, but the optimum tilt is only achieved very imperfectly. Moreover, it is a very fragile construction, which in practice is incompatible with ocean operation.

It is an object of the present invention to provide a device for collecting energy with constantly procures an optimum yield from the panel, whilst being of robust and economical construction.

According to the invention, the device for converting energy of the fluid in movement into mechanical energy comprises a rotor formed from panels mounted on a shaft by rotary axles permitting the variation in the tilt of these panels with respect to the shaft, notably under the effect of the variations in the speed of the fluid, and it is characterized in that these panels comprise means for ballast and/or flotation of predetermined mass and position to confer on them a planing wing mass structure relative to the fluid, whose angle of incidence adapts itself automatically to the speed of the fluid.

Not only is the use of stops or of a spring or of any stroke limiting device thus avoided, but it ensures that the panel will take up the optimum tilt under the action of a fluid flow parallel to the shaft, to confer maximum efficiency on the machine.

According to an advantageous embodiment of the invention, the ballast means comprise a weight fixed to the panel by a post. These weights may suffice to localize the centre of gravity of the panel in order to achieve the desired result.

It is also possible to provide on each a float which, in under-water operation, completes or replaces the action of the weight.

According to a preferred embodiment of the invention, several panels are mounted rotatably on the same axle, independent of one another in rotation, and each carries a predetermined ballast.

As the linear speed of the various panels varies according to their distance from the shaft, each of them takes up its optimum incidence as a function of this speed, independently of the others, and the whole unit approximates the shape of an ideal helicoid.

According to an improved embodiment of the invention, the panels are distributed into several rotors staged along the shaft, the shaft comprising a corresponding number of coaxial tubular elements, independent of one another in rotation and each connected to a rotor.

The recovery of energy is thus multiplied economically. Moreover it is possible to rotate the various stages in different directions to eliminate counter-torques.

According to a first application of the invention, the shaft is connected by a mechanical transmission to an electric generator housed in a floating fluid-tight chamber, and, in operation, it extends vertically below said chamber.

The chamber follows the movements of the swell at the surface and drives the panels in an alternating upward movement in calm deep water.

According to a second application of the invention, the shaft is connected by a mechanical transmission to an electric generator, the whole being housed dry in a floating and ballasted funnel, open to the atmosphere at its upper part and communicating through its lower part with a sheet of water of variable level.

This sheet may advantageously be constituted by the surface of the sea. The intermediate air shelters the device from mechanical and corrosive attacks by sea water.

According to an improved embodiment of the invention, the device comprises a number of peripheral blades parallel to the shaft and extending radially with respect to the latter.

These radial blades resist the rotation of the whole unit countering the rotation of the panels.

Preferably, the blades are connected to an orienting mechanism servo-coupled to an azimuth detector with a remote-controlled set point.

By actuating the blades, the whole unit can be moved in the sea, by remote-control, so as to select the preferred site at any moment.

Other features and advantages of the invention will also become apparent from the detailed description which follows.

In the accompanying drawings, given by way of non-limiting examples:

FIG. 1 is a perspective view with part torn away, of a device according to the invention;

FIG. 2 is a perspective view on a larger scale and partly exploded, of a rotor;

FIG. 3 is a plan view of a panel;

FIG. 4 is a side view of a panel, along IV—IV of FIG. 3;

FIG. 5 is an horizontal cross-sectional view of a rotor in a modified embodiment of the invention;

FIG. 6 is a perspective view similar to FIG. 1, in another modified embodiment;

FIG. 7 is a vertical cross-sectional view of another embodiment of the invention;

FIG. 8 is a semi-diagrammatic vertical cross-sectional view of a particular embodiment of the invention;

FIG. 9 is a plan view along IX—IX of FIG. 8.

With reference to FIGS. 1 to 4, a device according to the invention, shown floating on the sea (FIG. 1), comprises a fluid-tight chamber 1 surmounted by a beacon 1a and in which an electric generator 2 is housed, connected by a mechanical transmission 3 to a shaft 4 located in an extension 5 of the chamber 1. In operating position, the shaft 4 extends vertically towards the sea bed and it is borne by bearings 4a fixed to the extension 5.

The shaft 4 emerges at the end of the extension 5 through sealing means of a known type and carries at its end two transverse axles 6 aligned with one another, on each of which is rotatably mounted a profiled panel 7, with a weak frictional fitting. The panel is held in position by a nut 8 screwed onto a threaded end 9 of the axle 6, the panel being supported also by a shoulder 11 of the axle 6 through a washer 12.

The axis of rotation of the panel 7 does not pass through the center of thrust of the panel but is situated nearer the leading edge 13 than the trailing edge 14, so that a flow of water parallel to the shaft 4 tends to rotate the panel around the axle 6.

On its lower surface (in operating position), a profiled weight 15 is fixed by means of a post 16. In the same way, on the upper surface is fixed a profiled float 17 through a post 18.

The mass of the weight 15 and the volume of the float 17, as well as their positions, are determined according to the laws of hydrodynamics to confer to the panel 17 a planing wing structure taking up automatically, in a fluid in relative motion, an angle at incidence which is dependent on its relative speed with respect to the fluid.

The device operates in the following manner:

The water being assumed motionless, the panels 7 are positioned horizonally under the action of the weights and of the floats.

If the sea is subjected to a swell motion, this motion, which only affects the water masses closest to the surface, results by way of floating effect in an alternating motion of the device. The panels 7, which are located in deep masses of water not affected by the motion of the swell, are therefore subjected to an alternating relative flow of water parallel to the shaft 4.

Under the action of this flow, the panels 7 begin to tilt as indicated above. They then form propeller blades which drive the shaft 4 in rotation. The panels then present with respect to the water a vertical component of relative speed and a horizontal component along a circular path. Due to their wing structure they then spontaneously take up an angle of incidence resulting from the laws of hydrodynamics.

When the swell motion is reversed, the reversing of the vertical component causes the tilting of the panels, which reverses the pitch of the propeller, and the shaft 4 continues to rotate in the same direction.

Without any mechanical means for limiting the stroke, the panels spontaneously take up an optimum incidence, which results from the laws of hydrodynamics, which ensures optimum panel efficiency.

An improved embodiment of the invention will now be described with reference to FIG. 5.

The shaft 4 here carries three axles 6 off-set from one another by 60°, and on each of these axles are mounted two panels 7a, 7b which follow one another from the shaft 4. In addition, these panels are cut out in the form of annular segments, so as to practically cover the whole periphery of the rotor, the leading edge 13a (or 13b) of each of them being near the trailing edge 14a (or 14b) of the neighboring panel.

As in the preceding embodiment, the panels bear floats 17a, 17b, as well as weights (not shown).

The annular cutting out has the advantage that the whole section of the water flow passes across the panels to yield its energy.

In addition, two panels 7a and 7b hinged on the same axle 6 have, in operation, speeds having different horizontal components and these panels take up different incidences according to these components. The assembly of these two panels then has a structure close to that of an ideal helicoid.

In the embodiment shown in FIG. 6, the rotary parts may advantageously be distributed among several rotors. One rotor (10) comprises panels 7 fixed to axle 6 as indicated above, these axles being fixed to a shaft 4. On the other hand, panels 107 are fixed to axles 106 themselves fixed to a shaft 104 hollow and coaxial with the shaft 4 to constitute a second rotor 110. The chamber 1 then contains two electric generators 2, 102 connected respectively through mechanical transmissions 3, 103 to the shafts 4, 104.

The panels 7, 107 are respectively mounted on the axles 6, 106 so that the rotors 10 and 110 rotate in opposite directions, which eliminates the counter-torque.

A modified embodiment of the invention will now be described with reference to FIG. 7.

A funnel 201 is constructed so as to float in water. In the example described, this funnel is hollow and it is provided at its base with a ballast 221 intended notably to hold it in vertical position.

It is known that, placed in a mass of water actuated with alternating upward movements, such a device tends to remain motionless under the effect of its inertia, according to the so-called "Froude's pole" principle.

In an extension 201a of the funnel 201 is fixed an electric generator 202 including a shaft 204 to which are fixed axles 206 bearing panels 207 similar in arrangement to those previously described.

Funnel 201 is open at its two ends and also includes lateral openings 222. In addition, the ballast 221 is calculated so that the upper part of the funnel emerges to a considerable extent, notably the extension 201a, the generator 202 and the panels 207.

In operation, the swell motion causes variations in the water level in the funnel 201, which remains substantially motionless as indicated above, the water entering and emerging through the lower opening and through the lateral openings 222. These variations cause in turn an alternating movement of the air in the extension 201a, which acts on the panels 207 to rotate the shaft 204.

Of course, this embodiment can benefit in whole or in part from the improvements described above.

An additional improvement of the invention will now be described with reference to FIGS. 8 and 9.

As in the preceding constructions, a floating chamber 301 contains a generator 302 connected by a mechanical transmission 303 and a shaft 304 on which axles 306 are fixed bearing panels 307.

The chamber 301 is provided with a number of peripheral supports 325 distributed regularly, on which are mounted rotatably blades 326 through shafts 327. These blades extend vertically from the supports 325.

Each shaft 327 is connected to a stepping motor 328 whose frame is fixed to the support 325 so as to be able to orient the corresponding blade. The motors 328 are connected electrically, by a connection not shown, to an azimuth detector 329 fixed to the chamber 301. This detector, which may be a magnetic or gyroscopic compass, is provided with a setting point remote-controlled by radio-electric waves.

In operation, an azimuth direction is set by radio on the detector 329 which controls, according to a program of known type, the motors 328 for actuating the blades 326 with a movement which causes the shifting of the whole of the device in the selected azimuth direction.

Thus at any moment the device can be shifted to a more favorable region of the sea. On immobilisation, the blades are arranged radially, (FIG. 9) in order to produce an anti-rotary effect.

We claim:

1. A device to convert wave energy into mechanical energy, comprising a floating structure of a height in the water such that the upper portion of the structure is subject to wave action and the lower portion is disposed in still water, whereby the water adjacent the upper portion of the structure has vertical motion alternately in opposite directions relative to the water adjacent the lower portion of the structure, a vertical rotatable shaft carried by the structure, a plurality of axles extending radially outwardly from the shaft, panels mounted for vertical swinging movement on the shaft about axes spaced from the center of thrust of vertically moving fluid on the panels, said panels being disposed in a fluid, said fluid and said panels having relative vertical movement in alternately opposite directions as a result of said wave action, and ballast and/or float means carried by said panels to maintain said panels horizontal in the absence of said relative vertical movement, said ballast and/or float means conferring on said panels a planing wing action upon said relative vertical movement thereby to rotate said shaft in the same direction regardless of the direction of said relative vertical movement.

2. A device as claimed in claim 1, in which said structure rises and falls with the waves and said panels are immersed in said still water, said still water comprising said fluid.

3. A device as claimed in claim 1, in which said structure remains stationary and the panels are mounted adjacent the top of the structure, said fluid moving vertically past the panels in alternately opposite directions.

4. A device as claimed in claim 3, in which said panels are disposed above the water level and said fluid is air impelled in opposite vertical directions by wave action.

5. A device as claimed in claim 2, in which said structure includes a sealed chamber that floats on the surface of the water, the upper end of said shaft extending into said chamber, and transmission means disposed in said chamber for transmitting rotation of said shaft to an electric generator.

6. A device as claimed in claim 5, in which said generator is disposed in said sealed chamber.

7. A device as claimed in claim 1, in which said ballast and/or float means comprises a weight fixed to the panel and extending a distance below the axis of rotation of the panel.

8. A device as claimed in claim 1, in which said ballast and/or float means comprises a float fixed to the panel and extending a distance above the axis of rotation of the panel.

9. A device as claimed in claim 1, and a second tubular shaft coaxial with the first-mentioned shaft and having axles and panels as on the first-mentioned shaft but with the panels on the second shaft extending in the opposite horizontal direction to drive said second tubular shaft in the direction of rotation opposite that of the first-mentioned shaft.

10. A device as claimed in claim 1, said panels being arcuate about the axis of said shaft.

11. A device as claimed in claim 10, there being a plurality of concentric annular rows of said panels.

* * * * *